United States Patent [19]
Dufaux et al.

[11] Patent Number: 5,528,853
[45] Date of Patent: Jun. 25, 1996

[54] MAGNETIC COMPUTERIZED MOUSE TRAP

[75] Inventors: Donald W. Dufaux, R.R. 3, Box 243, Middletown, Mo. 63359-9229; George Spector, New York, N.Y.

[73] Assignee: Donald W. Dufaux, Middletown, Mo.

[21] Appl. No.: 461,628

[22] Filed: Jun. 5, 1995

[51] Int. Cl.$^6$ ............................................. A01M 23/30
[52] U.S. Cl. ........................................ 43/83.5; 43/81
[58] Field of Search ............................... 43/98, 81, 81.5, 43/82, 83, 83.5, 77, 78, 75

[56]              References Cited
         U.S. PATENT DOCUMENTS

| 3,204,366 | 9/1965 | Weimer | 43/83.5 |
|---|---|---|---|
| 4,349,980 | 9/1982 | McKee | 43/81 |
| 4,483,094 | 11/1984 | McKee | 43/75 |
| 5,184,416 | 2/1993 | Brewer | 43/81 |
| 5,477,635 | 12/1995 | Orsano | 43/81 |

*Primary Examiner*—Jeanne M. Elpel

[57]           ABSTRACT

A magnetic computerized mouse trap comprising a base having an upper surface, opposite sides and opposite ends. A trap bar is pivotally mounted on the upper surface of the base, for pivotal movement about a horizontal axis between a cocked position and a sprung position. A spring is for urging the trap bar towards the sprung position on the upper surface of the base. A pair of magnetic channel brackets are provided, with each mounted on the upper surface adjacent one side of the base, to retain the trap bar in the cocked position. A first electronic circuit is manually activated for magnetizing the magnetic channel brackets. The trap bar can be manually put into and held in the cocked position on the upper surface of the base. A grid is on the upper surface of the base at the sprung position. A food tray is on the grid for holding bait thereon. A second electronic circuit is manually activated for setting the trap after the first electronic circuit is manually activated. When a mouse steps onto the grid to get the bait in the food tray, the second electronic circuit will automatically deactivate the first electronic circuit, to demagnetize the magnetic channel brackets and release the trap bar from the cocked position, allowing the trap bar to go into the sprung position by the urging of the spring.

4 Claims, 1 Drawing Sheet

MAGNETIC COMPUTERIZED MOUSE TRAP

BACKGROUND OF THE INVENTION

The instant invention relates generally to animal traps and more specifically it relates to a magnetic computerized mouse trap, which provides an electronic circuitry to set a trap bar that is then released by a mouse stepping onto the trap.

There are available various conventional animal traps which do not provide the novel improvements of the invention herein disclosed.

SUMMARY OF THE INVENTION

A primary object of the present invention is to provide a magnetic computerized mouse trap that will overcome the shortcomings of the prior art devices.

Another object is to provide a magnetic computerized mouse trap that contains a magnetizing set circuit, which when activated will hold down the spring biased trap bar that is manually set, so as not to endanger the hands and fingers when placing the trap in a desired location.

An additional object is to provide a magnetic computerized mouse trap that contains a release set circuit, which when activated will set the entire trap, so as to be triggered by a mouse stepping onto the trap to reach for food placed thereon.

A further object is to provide a magnetic computerized mouse trap that is simple and easy to use.

A still further object is to provide a magnetic computerized mouse trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
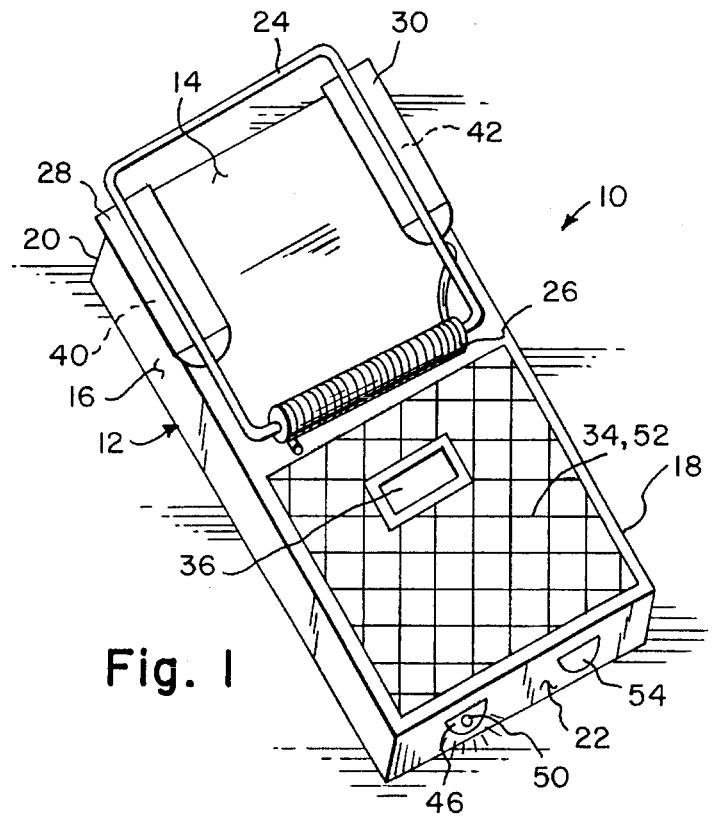
FIG. 1 is a diagrammatic perspective view of the instant invention.
Figure 2:
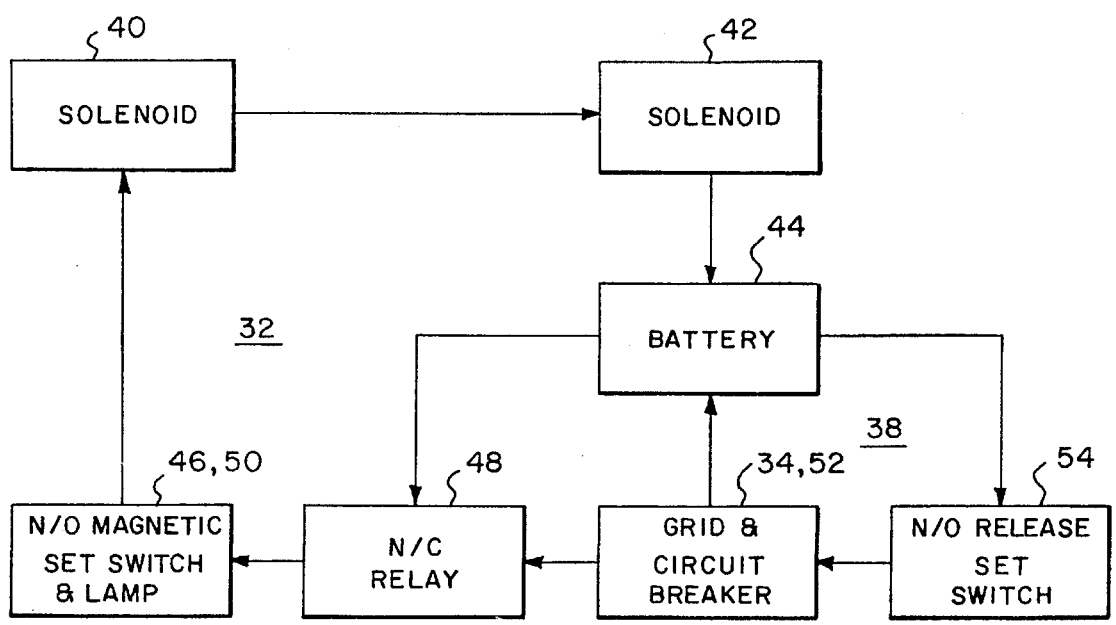
FIG. 2 is a block diagram of the electrical circuit utilized in the instant invention.

Turning now descriptively to the drawings, in which similar reference characters denote similar elements throughout the several views, FIGS. 1 and 2 illustrate a magnetic computerized mouse trap 10, comprising a base 12 having an upper surface 14, opposite sides 16, 18 and opposite ends 20, 22. A trap bar 24 is pivotally mounted on the upper surface 14 of the base 12, for pivotal movement about a horizontal axis between a cocked position and a sprung position. A spring 26 is for urging the trap bar 24 towards the sprung position on the upper surface 14 of the base 12. A pair of magnetic channel brackets 28, 30 are provided, with each mounted on the upper surface 14 adjacent one side 16, 18 of the base 12, to retain the trap bar 24 in the cocked position. A first electronic circuit 32, as shown in FIG. 2, is manually activated for magnetizing the magnet channel brackets 28, 30. The trap bar 24 can be manually put into and held in the cocked position on the upper surface 14 of the base 12. A grid 34 is on the upper surface 14 of the base 12 at the sprung position. A food tray 36 is on the grid 34 for holding bait thereon.

A second electronic circuit 38, as shown in FIG. 2, is manually activated for setting the trap 10 after the first electronic circuit 32 is manually activated. When a mouse steps onto the grid 34 to get the bait in the food tray 36, the second electronic circuit 38 will automatically deactivate the first electronic circuit 32, to demagnetize the magnetic channel brackets 28, 30 and release the trap bar 24 from the cocked position, allowing the trap bar 24 to go into the sprung position by the urging of the spring 26.

The first electronic circuit 32, as shown in FIG. 2, includes a pair of solenoids 40, 42 with each located within one magnetic channel bracket 28, 30. A battery 44 is electrically connected to the solenoids 40, 42. A normally opened magnetic set switch 46 is electrically connected to the solenoids 40, 42. A normally closed relay 48 is electrically connected between the battery 44 and the magnetic set switch 46. When the magnetic set switch 46 is manually closed, the solenoids 40, 42 will be activated to magnetize the magnetic channel brackets 28, 30. The magnetic set switch 46 contains a built in lamp 50. When the magnetic set switch 46 is manually closed, the lamp 50 will illuminate to indicate that the first electronic circuit 32 is working properly.

The second electronic circuit 38, as shown in FIG. 2, consists of a circuit breaker 52 built into the grid 34. The circuit breaker 52 is electrically connected to the battery 44 and the normally closed relay 48. A normally opened release set switch 54 is electrically connected between the battery 44 and the circuit breaker 52. When the release set switch 54 is manually closed, the circuit breaker 52 will be activated to open the relay 48 when the mouse steps onto the grid 34, thereby deactivating the solenoids 40, 42 which will demagnetize the magnetic channel brackets 28, 30 to release the trap bar 24 from the cocked position.

OPERATION OF THE INVENTION

To use the magnetic computerized mouse trap 10, as shown in FIGS. 1 and 2, simply place bait into the food tray 36. Next push the magnetic set switch 46, which will magnetize the magnetic channel brackets 28, 30 and illuminate the lamp 50. Then pull back the trap bar 24 and place it into the grooves of the magnetic channel brackets 28, 30 to be held thereto. Place the mouse trap 10 in the desired place. Once the mouse trap 10 is positioned, push the release set switch 54 which activates the circuit breaker 52 in the grid 34, to set the trap 10. When the mouse steps onto the grid 34, it will break the circuit 32 and demagnetize the channel brackets 28, 30. This releases the trap bar 24 with the force of the spring 26 striking and killing the mouse.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A magnetic computerized mouse trap comprising:
   a) a base having an upper surface, opposite sides and opposite ends;
   b) a trap bar pivotally mounted on said upper surface of said base, for pivotal movement about a horizontal axis between a cocked position and a sprung position;

c) a spring for urging said trap bar towards the sprung position on said upper surface of said base;

d) a pair of magnetic channel brackets, each mounted on said upper surface adjacent one said side of said base, to retain said trap bar in the cocked position;

e) a first electronic circuit which is manually activated for magnetizing said magnetic channel brackets, so that said trap bar can be manually put into and held in the cocked position on said upper surface of said base;

f) a grid on said upper surface of said base at the sprung position;

g) a food tray on said grid for holding bait thereon; and h) a second electronic circuit which is manually activated for setting said trap after said first electronic circuit is manually activated, whereby when a mouse steps onto said grid to get the bait in said food tray, said second electronic circuit will automatically deactivate said first electronic circuit to demagnetize said magnetic channel brackets and release said trap bar from the cocked position, allowing said trap bar to go into the sprung position by the urging of said spring.

2. A magnetic computerized mouse trap as recited in claim 1, wherein said first electronic circuit includes:

a) a pair of solenoids, each located within one said magnetic channel bracket;

b) a battery electrically connected to said solenoids;

c) a normally opened magnetic set switch electrically connected to said solenoids; and d) a normally closed relay electrically connected between said battery and said magnetic set switch, so that when said magnetic set switch is manually closed said solenoids will be activated to magnetize said magnetic channel brackets.

3. A magnetic computerized mouse trap as recited in claim 2, wherein said magnetic set switch includes a built in lamp, so that when said magnetic set switch is manually closed, said lamp will illuminate to indicate that said first electronic circuit is working properly.

4. A magnetic computerized mouse trap as recited in claim 1, wherein said second electronic circuit includes:

a) a circuit breaker built into said grid, said circuit breaker electrically connected to said battery and said normally closed relay; and b) a normally opened release set switch electrically connected between said battery and said circuit breaker, so that when said release set switch is manually closed, said circuit breaker will be activated to open said relay when the mouse steps onto said grid, thereby deactivating said solenoids which will demagnetize said magnetic channel brackets to release said trap bar from the cocked position.

* * * * *